(12) United States Patent
Lin et al.

(10) Patent No.: US 11,320,157 B2
(45) Date of Patent: May 3, 2022

(54) ROOF-MOUNTED SUCTION VENTILATOR

(71) Applicants: Jason Lin, Fremont, CA (US);
Jianfang Lin, Jiangmen (CN)

(72) Inventors: Jason Lin, Fremont, CA (US);
Jianfang Lin, Jiangmen (CN)

(*) Notice: Subject to any disclaimer, the term of this patent is extended or adjusted under 35 U.S.C. 154(b) by 136 days.

(21) Appl. No.: 15/732,337

(22) Filed: Oct. 26, 2017

(65) Prior Publication Data

US 2018/0119969 A1    May 3, 2018

Related U.S. Application Data

(60) Provisional application No. 62/496,737, filed on Oct. 28, 2016.

(51) Int. Cl.
*F24F 7/02* (2006.01)
*B60H 1/26* (2006.01)
*B60H 1/24* (2006.01)

(52) U.S. Cl.
CPC .............. *F24F 7/02* (2013.01); *B60H 1/248* (2013.01); *B60H 1/262* (2013.01)

(58) Field of Classification Search
CPC . B60H 1/26; B60H 1/248; B60H 1/24; B60H 3/06; F24F 7/02; F24F 7/007; F24F 7/013; F24F 2007/003; F24F 2007/001; F24F 13/082; F24F 13/20; F24F 2221/52; E04D 13/0325; B63J 2/10; E04F 17/00
USPC ... 454/433, 33, 35, 38, 39, 52, 367, 147, 82
See application file for complete search history.

(56) References Cited

U.S. PATENT DOCUMENTS

| | | | | |
|---|---|---|---|---|
| 552,828 | A * | 1/1896 | Eigel | F23L 17/02 454/39 |
| 2,084,338 | A * | 6/1937 | Hamblin | B63J 2/10 454/10 |
| 3,345,931 | A * | 10/1967 | Walsh | F23L 17/02 454/38 |
| 3,382,792 | A * | 5/1968 | Howard | F24F 7/02 454/341 |
| 4,848,653 | A * | 7/1989 | Van Becelaere | F24F 7/02 236/49.3 |
| 6,102,794 | A * | 8/2000 | Cline | F24F 7/02 454/368 |
| 7,001,266 | B2 * | 2/2006 | Jones | E04D 5/14 454/364 |

(Continued)

FOREIGN PATENT DOCUMENTS

CN    202157975 U  *  6/2011  ............. F04D 25/08

*Primary Examiner* — Steven B McAllister
*Assistant Examiner* — Charles R Brawner

(57) ABSTRACT

A natural ventilator is herein disclosed that is free of moving parts, wind-activated, rain-proof, and free of dust or smog infiltration. It is not only suitable to be a standalone natural ventilator, but is also advantageous to be used as an enhanced exhaust exit in a forced-air ventilation system, for such enclosed spaces or objects as buildings and vehicles. It can also be used as a suction generator that supplies so-called suction or negative pressure to help stabilize such building components as roof membranes by channeling the low pressure to their underside to balance the wind uplift above. The ventilator has an enhanced rainwater-proof method that serves to defend the vent system, and the space being vented, against rainwater invasion, even if raindrop trajectory becomes highly oblique from vertical as driven by strong winds.

12 Claims, 5 Drawing Sheets

(56) References Cited

U.S. PATENT DOCUMENTS

2005/0054281 A1\* 3/2005 Lin ................. B60H 1/248
  454/116
2006/0005479 A1\* 1/2006 Jones ................ E04D 13/17
  52/199

\* cited by examiner

ROOF-MOUNTED SUCTION VENTILATOR

CROSS-REFERENCE TO RELATED APPLICATIONS

This application is entitled to the benefit of Provisional Patent Application Ser. No. 62/496,737, filed 2016 Oct. 28.

BACKGROUND—FIELD OF INVENTION

This invention relates to an improved air exhaust system, which can be utilized in the field of building and vehicle ventilation.

BACKGROUND—DISCUSSION OF PRIOR ART

U.S. Pat. Nos. 4,223,486; 4,557,081; and 4,888,930 to T. L. Kelly, Waterbury, Conn. taught a method to equalize or balance the uplift on the upper surface of roof membranes by channeling the negative pressure therein to underneath the membrane, as well as to aid venting out moisture there under.

That method, while intended to tap the negative pressures that occur above the roof, has the potential to actually feed positive pressure into underneath the membrane, enhancing the uplift force so as to worsen the situation. This is because of the fact that the wind flow on the roof is highly turbulent and complex, frequently deviating from the situation the Kelly equalizer system is designed for. The method is also not suitable for wall-mounted applications. Particularly in wall edge areas the airflow is dominated by strong, fluctuating and intermittent vortices. Pressures therein fluctuate significantly from negatives to positives as evidenced in wind tunnel and field test data. Positive pressure will completely counter Kelly's intention with his device. Although the Kelly method also includes a valve intended to "prevent" any positive pressures from entering into underneath the membrane, the air tightness of the contracted valve sleeves is hardly sufficient to block out the infiltration of positive pressures. Such additional mechanism also complicates the system, increases the probability or chances of component and system failure, and raises the cost of the system as well.

In the field of building and vehicle ventilation, a number of designs exist for aiding air exhaust or air relief, for example, U.S. Pat. Nos. 6,582,291 B2; 6,302,778 B1; 5,326,313; 4,379,972; 4,086,028; and 3,952,638 to various inventors. However, none provides a simple and effective method. Most of them involve complicated and expensive moving parts such as turbines, fans and associated bearings etc., which also increase the chances of mechanical failure.

U.S. Pat. Nos. 7,001,266; 4,963,761; 4,603,619; 4,534,119; 3,509,811; 3,382,792; 3,347,147; 3,345,931; 2,387,708; and 211,872 to various inventors disclosed ventilators utilizing venturi effects; however, the disclosed configurations are all susceptible to rainwater infiltration into the interior, and are complicated and lead to higher material and fabrication costs.

U.S. Pat. No. 7,065,271 to Lin, U.S. patent application Ser. No. 11/177,492 of Jones et. al, and Ser. No. 12/101,625 of Lin disclosed ventilators that resolve rainwater infiltration concerns by using complicated air path with multiple turns, but such methods have also compromised highly-desired aerodynamic effectiveness for ventilation, as well as led to still relatively higher material and fabrication costs.

SUMMARY OF THE INVENTION

With a direct gas exit, along with new rainwater-proof mechanisms, the present invention provides a simpler roof-mounted gas exhaust device, or so-called suction ventilator, that is foolproof in ensuring "negative pressure" or suction at the exit under any external flow condition, which can be used for aiding air relief or ventilation in buildings, other enclosed facilities, vehicles or trailers. The external flow causing the suction can be from natural wind or due to the motion of a vehicle, on which the suction ventilator is installed.

By disposing the ventilator's exit opening or openings towards a contracted free space between a base body and a raised body, a venturi effect is created at the opening under natural wind where low-pressure, or so-called suction, draws air from inside the exit and into the external wind flow to be carried away. The faster the wind flow is, the lower the pressure becomes at the exit opening and the stronger the suction effect.

The ventilator disclosed herein has a direct gas exit without multiple turns of gas conduit, reducing drag to the gas flow and improving the ventilator's effectiveness, while still possessing a rainwater-proof property.

The low pressure generated at the exit opening is significantly lower than the internal pressure inside a building, vehicle, or compartments therein, and other enclosed objects or units, under essentially all external wind conditions. This effect lends the ventilator a functionality of aiding air exhaust, natural or forced, for the ventilation of spaces in buildings, enclosed facilities, vehicles or other enclosed objects and units that are connected to the ventilator. The ventilator disclosed herein is improved for forced air exhaust because it facilitates direct air exit without multiple turns of air conduits such that it presents less drag to air flow, while maintaining a rainwater-proof property.

The designs disclosed herein provide for a suction ventilator that effectively prevents rainwater from infiltrating into the interior, even if raindrop trajectory becomes highly oblique from vertical as driven by strong winds.

OBJECTS AND ADVANTAGES

Accordingly, several objects and advantages of the present invention are:

to provide a foolproof air exhaust ventilator that ensures "negative pressure" or suction at the gas exit under any external flow condition for improved air relief in buildings, enclosed facilities, vehicles, trailers or other such enclosed objects and units;

to provide a ventilator of zero energy consumption that uses only external natural wind energy;

to provide a device that obviates any moving parts, such as turbine, fan or bearing etc., which are expensive and often represent the sources of mechanical failure and render an exhaust system malfunctioned, and thus represents a reliable and durable device of low cost, low maintenance, low failure probability, long life expectance and no mechanical noise;

to provide a device that has relatively simple configuration and the ease to manufacture and install, whereas is still among the most effective and efficient;

to provide a ventilator that is rainwater-proof, smog-proof and dust-proof while having a direct exhaust exit to reduce drag to gas flow and increase effectiveness, efficiency and thus usefulness;

to provide a ventilator that is most suitable to be mounted on a substantially horizontal surface as situation requires;

Further objects or advantages are to provide a ventilator that is among the simplest, most lightweight, most inexpensive to manufacture and convenient to install, no troublesome moving parts, zero energy consumption but high exhaust efficiency, rain and smog infiltration proof. These and still further objects and advantages will become apparent from a consideration of the ensuing description and drawings.

DESCRIPTION OF THE PREFERRED EMBODIMENTS

Figure 1:
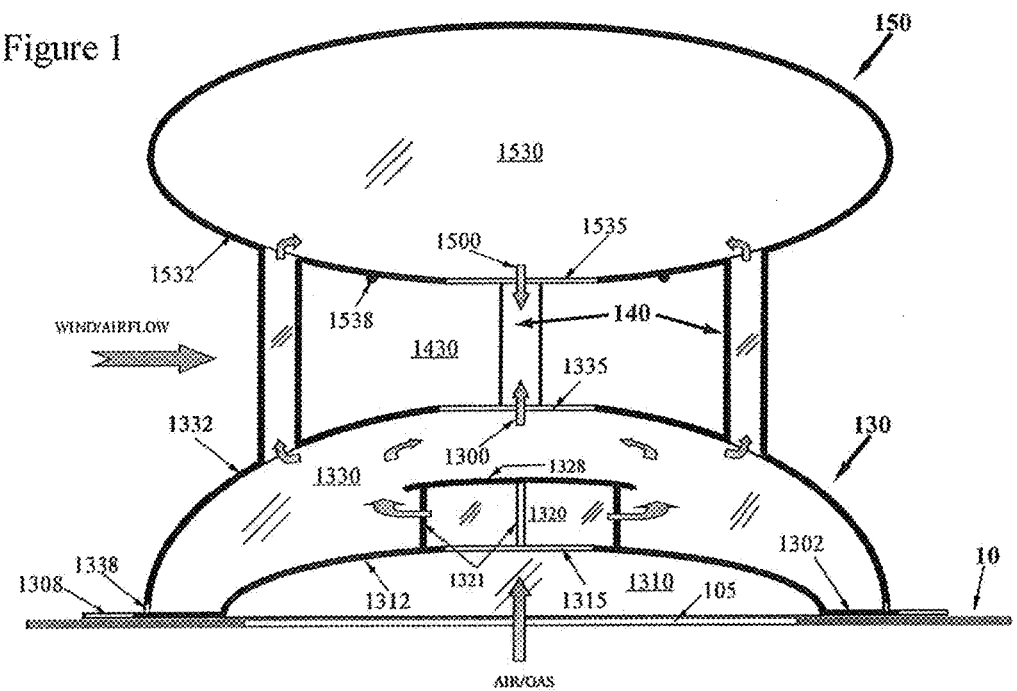
FIGS. 1 and 1a, which are a sectional side view and a top view respectively, schematically illustrates one of the preferred basic configurations of the device according to the present invention.
Figure 1A:
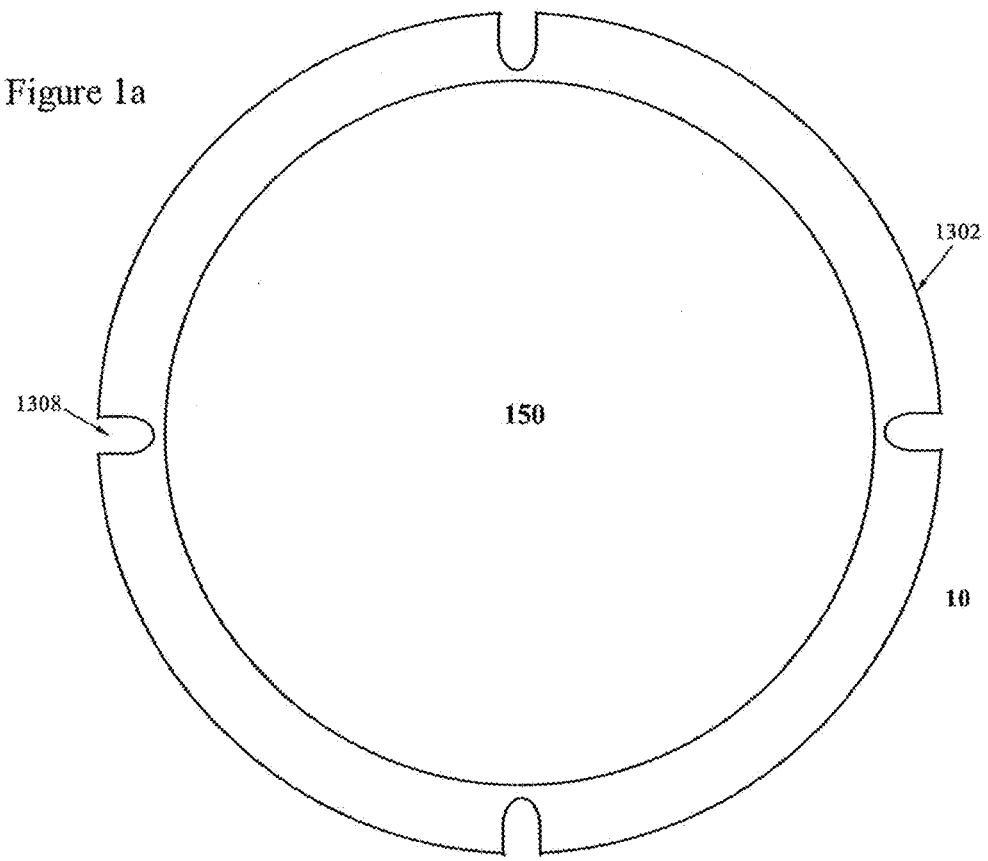

FIG. 1 illustrates one of the preferred configurations of the presently invented device, for a sectional side view as being mounted to a horizontal surface 10, with a top view of the device in FIG. 1a. A base body 130, as illustrated in FIG. 1, is to be secured with any appropriate means, for example through a fastened base flange plate 1302, onto the horizontal surface 10, which has an aperture 105 open to an internal space 1310 of the base body 130. A raised body 150 is supported on the base body 130 with a plurality of elongated members 140. The base body 130 and the raised body 150 each has a convex surface 1332 and 1532 facing one another, such that a free space 1430 formed between them is narrower at its center than away from its center, providing an airflow path that first contracts and then expands under any approaching wind direction. The number and size of the support members 140 should be sufficient to support the raised body 150 but not be excessive to over-occupy the free space 1430 formed between the raised body 150 and the base body 130.

The base body 130 has an opening 1335, or openings, near its center forming an exit from an upper interior space 1330 of the base body 130. Inside the base body 130, an umbrella-like cap 1328 is supported with a plurality of elongated members 1321 on a lower dome 1312, above and over an opening 1315, or openings, near the center of the top of the lower dome 1312. This interior assembly, while maintaining open paths for air flows, is designed to prevent rainwater dripped into the upper interior space 1330 from further entering the aperture 105 that is intended to be connected to a space needing ventilation. The rainwater will instead drain out through a plurality of apertures 1338 at the base of the base body 130 just merely above the flange plate 1302. A plurality of optional recesses or cut-outs 1308 can be made on the flange plate 1302 and aligned with a plurality of drainage apertures 1338 to further ensure smooth drainage and prevent rainwater back up from outside the apertures 1338.

When external airflow passes the free space 1430, which may be caused by wind or on a moving vehicle, it accelerates while approaching the center of the free space 1430 so that the air pressure therein becomes negative (lower) in reference to the ambient pressure, as governed by the Bernoulli principle, called venturi effect. The higher the wind speed, the stronger the negative pressure will be. This negative pressure, or so-called suction, induces a secondary flow 1300 through the exit opening 1335 towards the free space 1430, creating exhaust drawn from an interior space in a building or vehicle that is connected to the lower space 1310 of the base body 130 through the aperture 105 and further to the middle space 1320 and upper space 1330 through the opening 1315, under any ambient or external wind speed and direction. This suction effect can be channeled, with any appropriate means such as a conventional duct or conduit, to a specific space or spaces in a building, vehicle or trailer, for example, kitchens, bathrooms or lavatories therein, for ventilation purposes, improving air flux. This is applicable not only as a standalone method of natural ventilation, but also in mechanically forced ventilation scenarios. Examples of such forced ventilation scenarios include kitchen range hoods and bathroom fans, where a device derived from this invention is used as an exhaust exit of such ventilation system, enhances the exhaust efficiency with its suction mechanism described above, and prevents air backflow under any possible ambient wind speed and direction whether the system's mechanical forcing such as a fan is on or off.

Preferably, the raised body 150 is also hollow with an internal space 1530 and has an exit opening 1535, or openings, towards the free space 1430. Correspondingly the elongated support members 140 are hollow as well, allowing air or gas to flow through. This adds to the system another induced secondary airflow 1500 and related flow paths, enhancing the system's efficiency in exhaust flux. It also helps reduce the deadweight of the system and save material. However, they can also be solid without affecting their respective basic functionalities, when system weight and material cost are lesser an issue than other such factors as manufacture complexity, for example, when using certain lightweight synthetic material.

An optional convex ring 1538 can be added to the lower surface 1532 of the raised body 150 as a drip edge to stop creeping rainwater from dripping into the opening 1335. The diameter of the ring 1538 should be larger than the diameter of the opening 1335.

Figure 2:
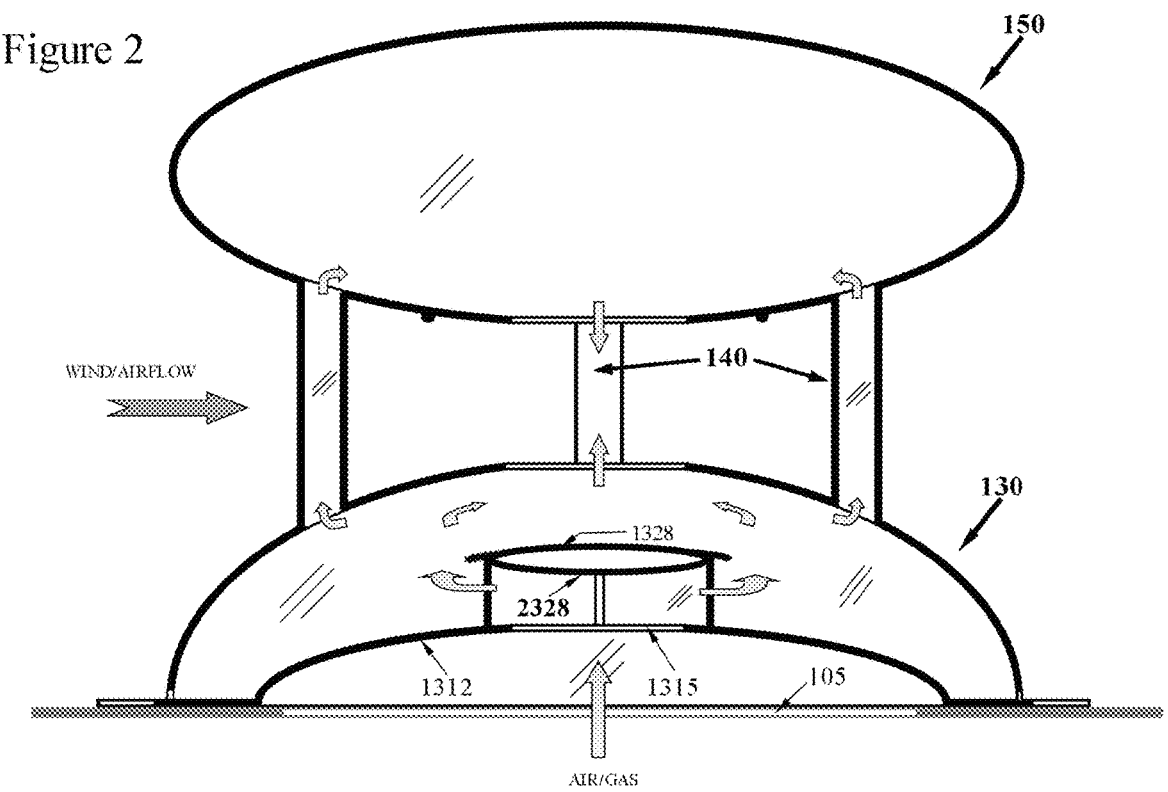
FIGS. 2-7, respectively, provide examples of various modifications to the internal mechanism designed to defend the system's interior against rainwater invasion.

The umbrella-like cap 1328 shown in FIG. 1 can be modified to have a slightly convex bottom face 2328 as shown in FIG. 2 to help streamline the exhaust flow path.

Figure 3:
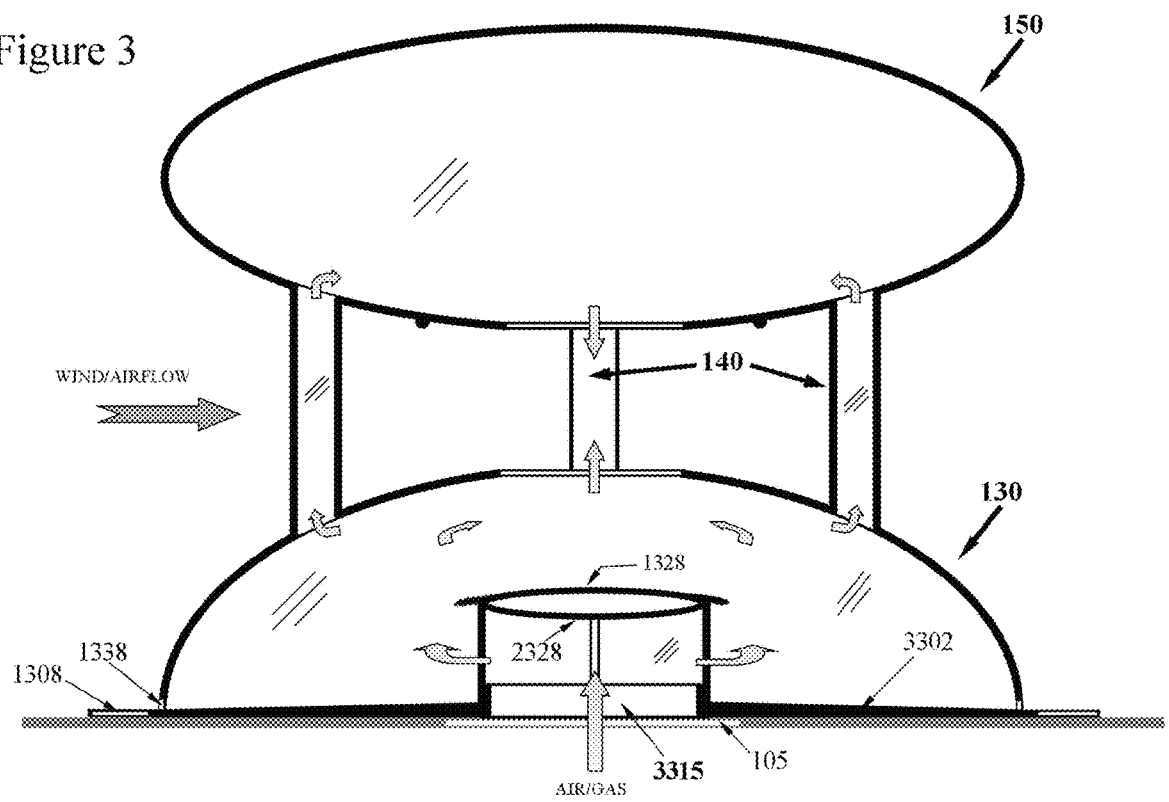

The internal lower dome 1312 along with its opening 1315 shown in FIGS. 1 and 2, can be replaced altogether with a collar-opening 3315 as illustrated in FIG. 3, to function as a water dam to prevent intruded rainwater from dripping into the interior space being vented. The base flange plate 3302 herein can be made to have a slight downward and outward slope, facilitating intruded rainwater to drain out through the apertures 1338.

Figure 4:
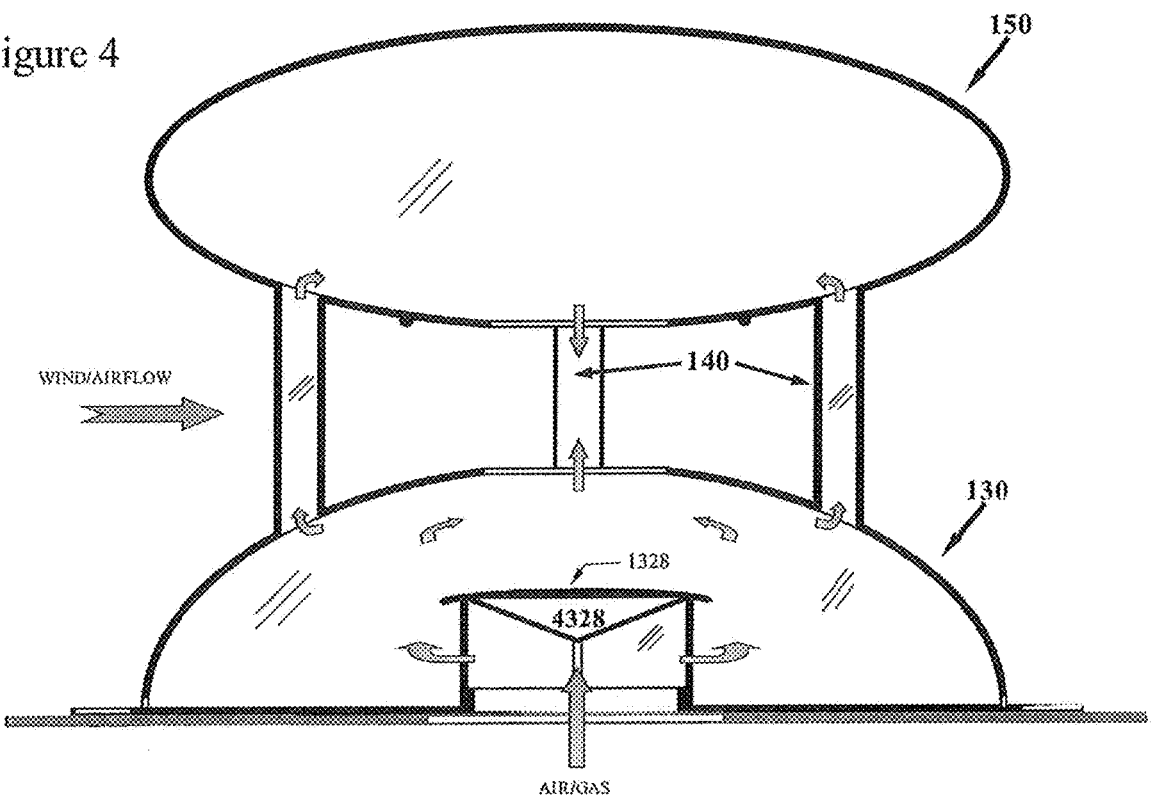
Figure 5:
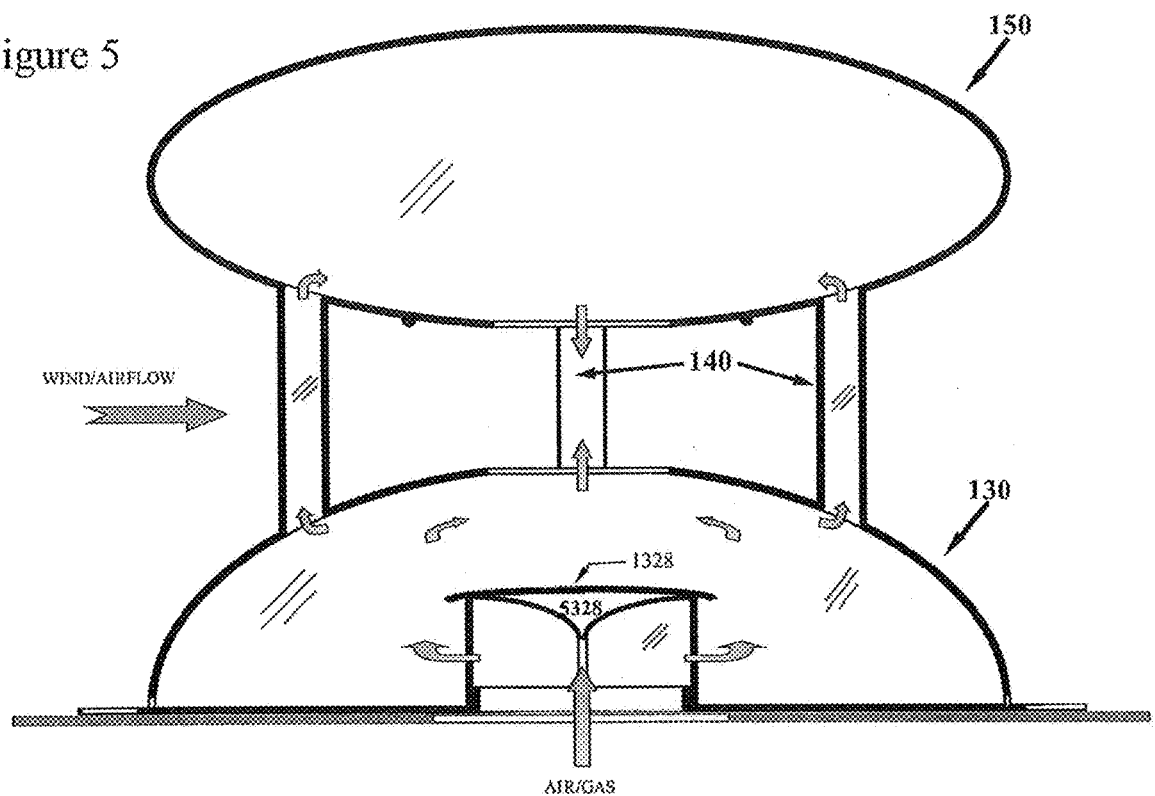
Figure 6:
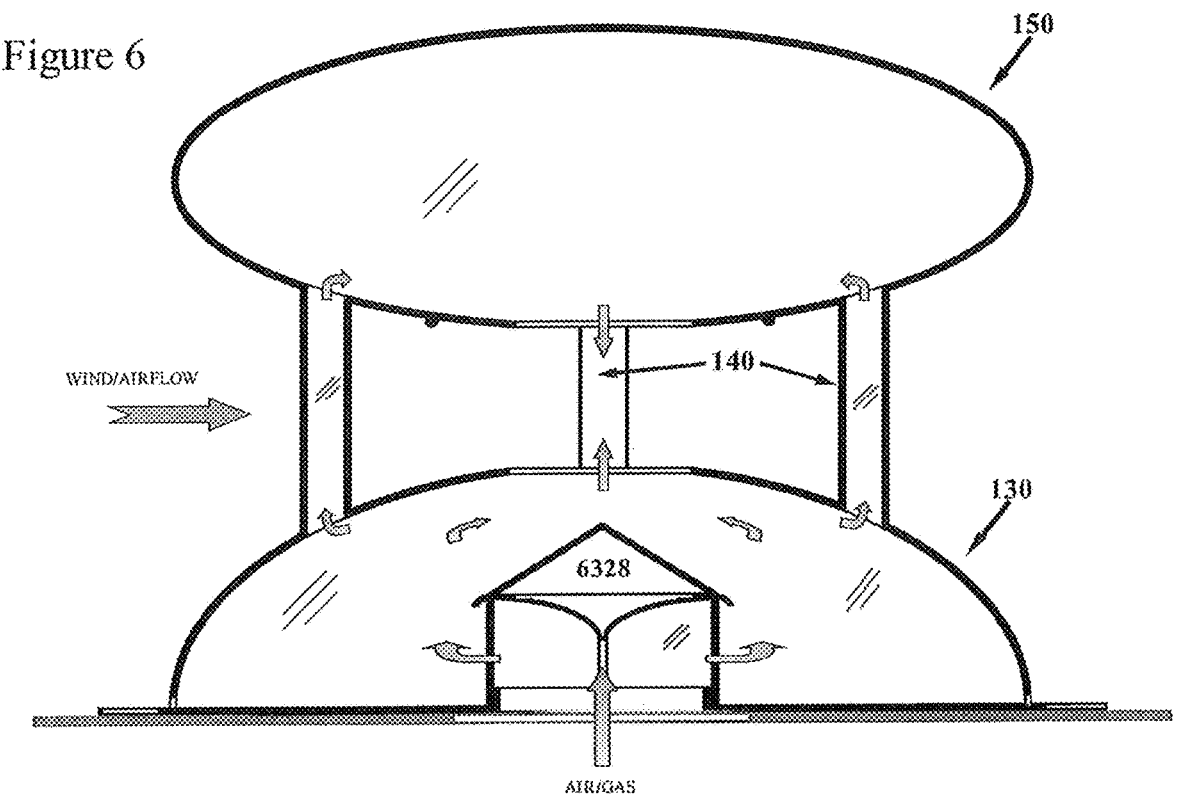
Figure 7:
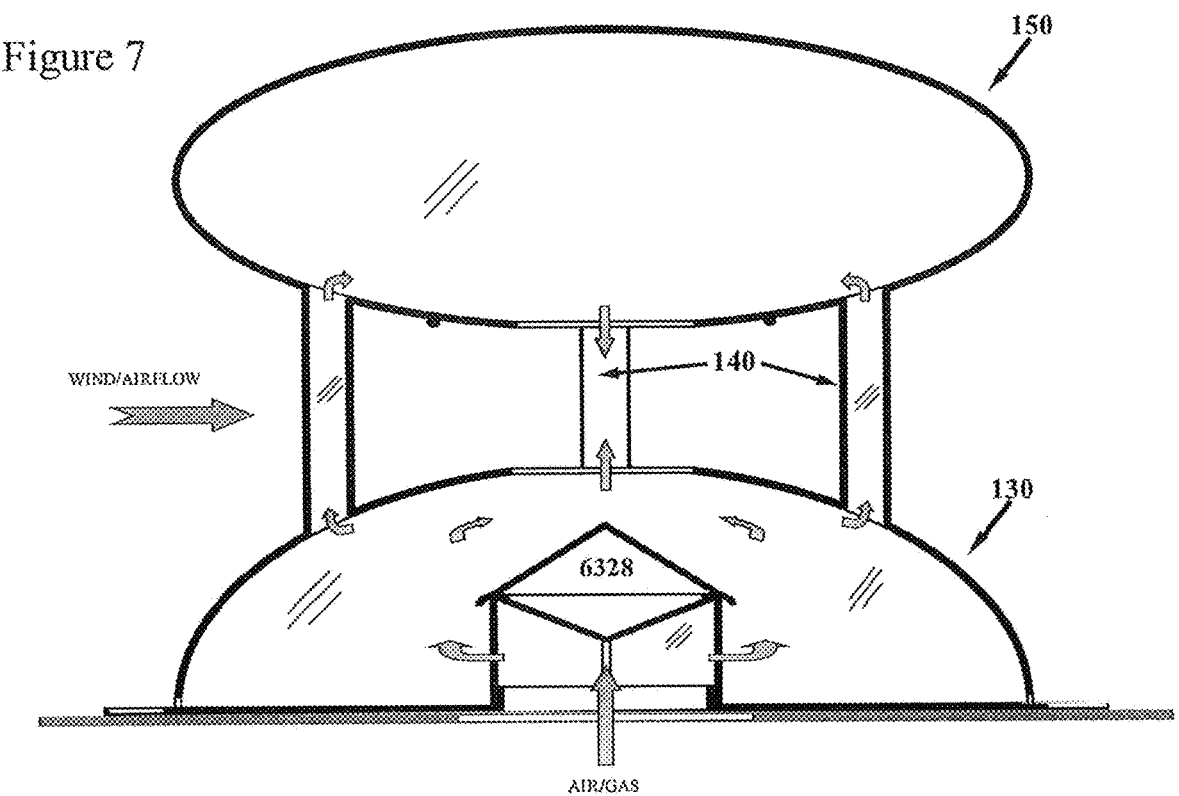

The bottom face 2328 of the umbrella-like cap 1328 shown in FIGS. 2 and 3 can be further modified to have a downward-pointing cone shape 4328 as depicted in FIG. 4 or 5328 in FIG. 5, respectively, as further examples of streamlining or regulating the exhaust flow path. Moreover, its upper surface can also be modified into an upward-pointing cone-like shape 6328, for example, as shown in FIGS. 6 and 7, respectively.

The many specific shapes, sizes and their proportions as sketched in previous figures are merely used as examples to assist in illustrating the general conception of the present invention; variations or modifications to the shapes, sizes and dimensional proportions are possible and allowable according to the spirit of this invention without jeopardizing the above-described mechanism and functionalities, as long as a free space between a raised body and a base body is formed in such a way that an airflow passing through from any direction would first contract and then expand to create a venturi effect, and a working mechanism is configured, particularly in the base body, to prevent excessive rainwater from entering the system itself and the spaces being connected and vented.

Figure 8:
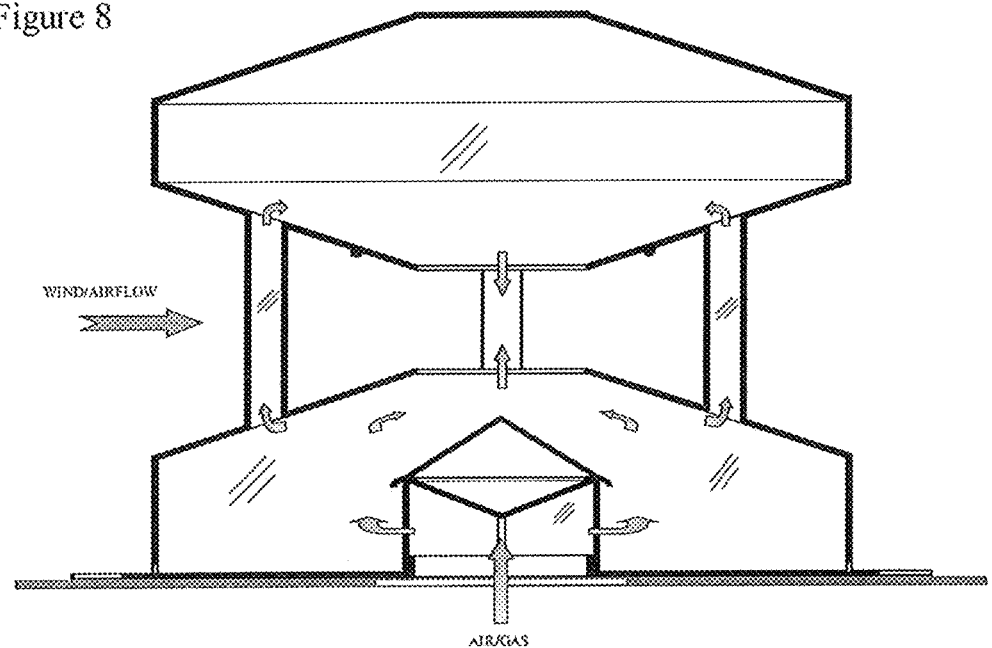
FIGS. 8 and 8a illustrate an example of allowable variation in exterior shape of the device.
Figure 8A:
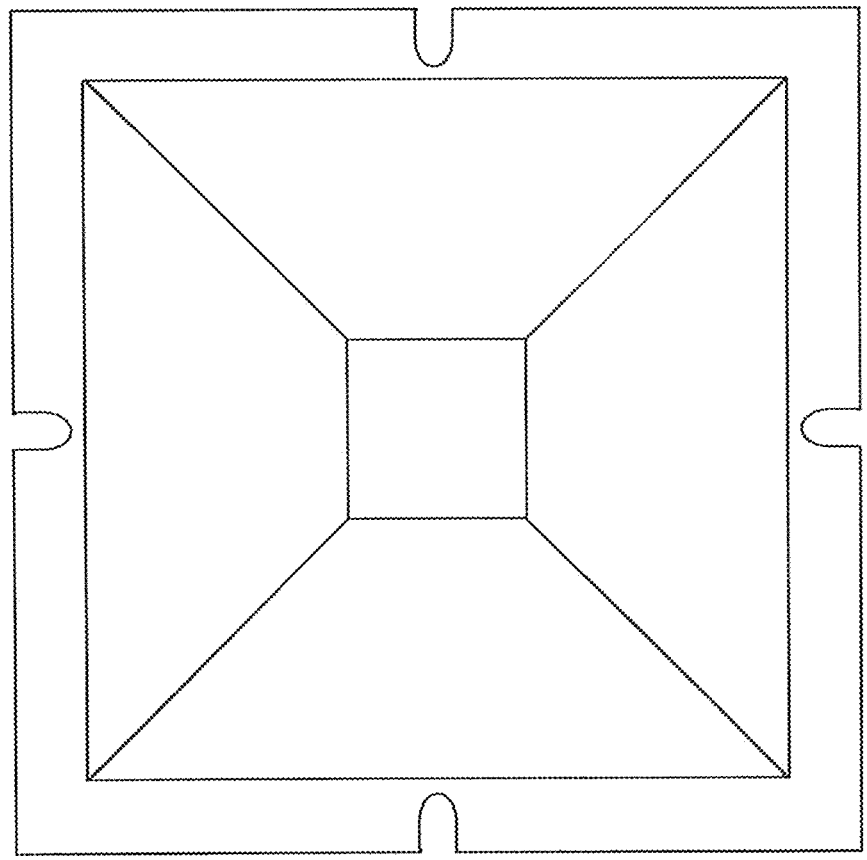

For example, merely for illustration purposes, the raised body and the base body shown in the above figures, along with many of the associated parts, are shown to consist of mostly curved or arched surfaces; however, plane surfaces are allowable as long as they conform to the general configuration described and will not jeopardize or significantly compromise the described aerodynamic mechanism and functionalities, where most importantly an airflow path between a base body and a raised body that first contracts and then expands should be substantially maintained. Such an example of using plane surfaces is given in FIGS. 8 and 8*a*.

Non-smooth surfaces, such as roughened, corrugated or ribbed, can be utilized for the raised body and/or the base body, for whatever purposes—architectural, aerodynamic, for example for flow separation control or airflow guide etc., as long as such local additions do not significantly alter the general shapes described.

Fixed or removable screens may be installed on the exit openings 1335 and 1535 (see FIG. 1 for example) to prevent flying insects or small birds from invading the system or an interior space being vented.

Moreover, the raised body can also be supported with a plurality of elongated members onto the flanged base plate instead of the upper face of the base body, or even onto another surface such as the roof. In this case, however, communications of the suction generated on the center opening of the raised body to the interior space being vented, are either restricted without being utilized, or channeled using a commonly accepted method separate from the method currently instructed.

Installation and Operation

In principle, the suction ventilator described herein is functional anywhere on an exterior surface of a building or vehicle where there are relative air movements, such as those caused by wind or on a moving vehicle, although there are optimal locations where installed suction ventilators will function most effectively. Generally, these locations are near edges and corners, where airflow velocity is normally the highest and local ambient air pressure is lowest most of the time.

Suction ventilators described in this application are passive, flow-activated devices. Once installed properly, they stay operating and functioning as wind blows, and require no active intervention. The stronger the wind blows, the more effective the suction ventilator is. Since there is no moving part involved in the entire system, minimal or no maintenance is required. Routine cleaning may be needed as other ventilation devices or systems will.

Conclusion, Ramifications, and Scope

It is apparent that suction ventilators of this invention provide an air or gas exhaust system that is aerodynamically advantageous, energy conserving, and rainwater-proof, and is still among the simplest, most inexpensive to manufacture and convenient to install. Unlike other ventilation options, such as exhaust fans or turbine vents, it involves no moving part or mechanism, so that it also possesses many additional qualities desired of a ventilator, including extremely low maintenance, essentially unlimited life expectancy, noise-free operation, and so on.

Although the description above contains many specifications, these should not be construed as limiting the scope of the invention but as merely providing illustrations of some of the presently preferred embodiments of this invention.

Various changes, modifications, variations can be made therein without departing from the spirit of the invention. For example, the outer perimeter edge of the raised body can be a sharp edge, instead of being a blunt edge as shown for all the above given examples. The suction ventilators can be made of any reasonably durable material with any appropriate means of fabrication as long as a configuration according to the spirit of this invention is accomplished to support the described working mechanism and to provide the associated functionalities. Various surface portions of a suction ventilator may also be roughened or bear such surface details as corrugation or ribs of adequate sizes, as opposed to perfectly smooth surfaces. Any appropriate conventional or new surface-mounting method can be used to secure a suction ventilator to a surface without departing from the spirit of this invention. If required in certain circumstances, the suction ventilator can also be elevated from the mounting surface, by extending or elongating the base body upwardly, or with one or more sufficiently strong supports connected to the base body where at least one support member is hollow such that it also functions as a conduit to channel the exiting gas. Thus the scope of the invention should be determined by the appended claims and their legal equivalents, rather than by the illustrations given as examples.

We claim:

1. A rooftop ventilator for an enclosed object, comprising:
a hollow base body having an upper face, at least one opening on said upper face, said hollow base body forming part of a conduit between said opening and an interior space of said enclosed object to be vented;
a raised body being supported and secured above said hollow base body with a first plurality of elongated members and having a lower face facing towards said upper face;
a rainwater infiltration defense mechanism being located inside said hollow base body and below said opening;
wherein at least one of said upper face and lower face being convex towards the other, and a free space being formed between said upper face and lower face, said free space being narrower near said opening than away from said opening, forming a first contracting and then expanding path for airflow approaching from any direction and passing through said free space between said upper face and lower face, whereby providing a venturi mechanism and generating low pressure in said free space near said opening, and hence a suction effect therein being communicated to said interior space of said enclosed object to be vented through said hollow base body;
wherein said hollow base body having a base plate, said base plate having at least one aperture for said hollow base body to communicate to said interior space of said enclosed object to be vented;
wherein said hollow base body having an internal cap supported and secured with a second plurality of elongated members above said aperture on said base plate, said internal cap being larger than said upper opening in diameter and having a solid upper surface sloping downwardly in radial directions starting from its center and ending at its perimeter, said internal cap further being configured to have an outwardly and downwardly extended drip edge at its perimeter, therein shielding said aperture and shedding water outwardly as part of said rainwater infiltration defense mechanism;
wherein said internal cap having a convex upper face and a convex lower face.

2. A rooftop ventilator for an enclosed object, comprising:
a hollow base body having an upper face, at least one opening on said upper face, said hollow base body forming part of a conduit between said opening and an interior space of said enclosed object to be vented;
a raised body being supported and secured above said hollow base body with a first plurality of elongated members and having a lower face facing towards said upper face;
a rainwater infiltration defense mechanism being located inside said hollow base body and below said opening;
wherein at least one of said upper face and lower face being convex towards the other, and a free space being formed between said upper face and lower face, said free space being narrower near said opening than away from said opening, forming a first contracting and then expanding path for airflow approaching from any direction and passing through said free space between said upper face and lower face, whereby providing a venturi mechanism and generating low pressure in said free space near said opening, and hence a suction effect therein being communicated to said interior space of said enclosed object to be vented through said hollow base body;
wherein said hollow base body having a base plate, said base plate having at least one aperture for said hollow base body to communicate to said interior space of said enclosed object to be vented;
wherein said hollow base body having an inside collar or an inner dome above and on said base plate and around said aperture, therein as part of said rainwater infiltration defense mechanism, said inside collar or said inner dome having an upper opening;
wherein said hollow base body having an internal cap supported and secured with a second plurality of elongated members above said upper opening on said inside collar or said inner dome, said internal cap being larger than said upper opening in diameter and having a solid upper surface sloping downwardly in radial directions starting from its center and ending at its perimeter, said internal cap further being configured to have an outwardly and downwardly extended drip edge at its perimeter, therein shielding said upper opening and shedding water outwardly as part of said rainwater infiltration defense mechanism;
wherein said internal cap having a convex upper face and a convex lower face.

3. A rooftop ventilator for an enclosed object, comprising:
a hollow base body having an upper face, at least one opening on said upper face, said hollow base body forming part of a conduit between said opening and an interior space of said enclosed object to be vented;
a raised body being supported and secured above said hollow base body with a first plurality of elongated members and having a lower face facing towards said upper face;
a rainwater infiltration defense mechanism being located inside said hollow base body and below said opening;
wherein at least one of said upper face and lower face being convex towards the other, and a free space being formed between said upper face and lower face, said free space being narrower near said opening than away from said opening, forming a first contracting and then expanding path for airflow approaching from any direction and passing through said free space between said upper face and lower face, whereby providing a venturi mechanism and generating low pressure in said free space near said opening, and hence a suction effect therein being communicated to said interior space of said enclosed object to be vented through said hollow base body;
wherein said hollow base body having a base plate, said base plate having at least one aperture for said hollow base body to communicate to said interior space of said enclosed object to be vented;
wherein said hollow base body having an internal cap supported and secured with a second plurality of elongated members above said aperture on said base plate, said internal cap being larger than said upper opening in diameter and having a solid upper surface sloping downwardly in radial directions starting from its center and ending at its perimeter, said internal cap further being configured to have an outwardly and downwardly extended drip edge at its perimeter, therein shielding said aperture and shedding water outwardly as part of said rainwater infiltration defense mechanism;
wherein a plurality of draining holes being facilitated on the lower wall of said hollow base body just above said base plate, therein to drain out residual rainwater having invaded said hollow base body;
wherein said base plate having outer perimeter cut-outs outside the lower wall of said hollow base body, therein to prevent rainwater from standing near said draining holes.

4. The device of claim 3, wherein said lower face of said raised body having at least one ring-shape drip edge facing said upper face of said hollow base body, wherein diameter of said ring-shape drip edge being larger than diameter of said opening of said hollow base body.

5. The device of claim 3, wherein said opening of said hollow base body having a protection screen, therein to prevent flying insects or birds from entering said opening.

6. The device of claim 3, wherein said raised body and at least one of said first plurality of elongated members being hollow, and wherein said raised body having an opening facing said opening of said hollow base body, therein forming a second conduit between said free space and said hollow base body.

7. The device of claim 6, wherein said opening of said raised body and said opening of said hollow base body having protection screens, therein to prevent flying insects or birds from entering the openings.

8. A rooftop ventilator for an enclosed object, comprising:
a hollow base body having an upper face, at least one opening on said upper face, said hollow base body forming part of a conduit between said opening and an interior space of said enclosed object to be vented;
a raised body being supported and secured above said hollow base body with a first plurality of elongated members and having a lower face facing towards said upper face;
a rainwater infiltration defense mechanism being located inside said hollow base body and below said opening;
wherein at least one of said upper face and lower face being convex towards the other, and a free space being formed between said upper face and lower face, said free space being narrower near said opening than away from said opening, forming a first contracting and then expanding path for airflow approaching from any direction and passing through said free space between said upper face and lower face, whereby providing a venturi mechanism and generating low pressure in said free space near said opening, and hence a suction effect therein being communicated to said interior space of said enclosed object to be vented through said hollow base body;

wherein said hollow base body having a base plate, said base plate having at least one aperture for said hollow base body to communicate to said interior space of said enclosed object to be vented;

wherein said hollow base body having an inside collar or an inner dome above and on said base plate and around said aperture, therein as part of said rainwater infiltration defense mechanism, said inside collar or said inner dome having an upper opening;

wherein said hollow base body having an internal cap supported and secured with a second plurality of elongated members above said upper opening on said inside collar or said inner dome, said internal cap being larger than said upper opening in diameter and having a solid upper surface sloping downwardly in radial directions starting from its center and ending at its perimeter, said internal cap further being configured to have an outwardly and downwardly extended drip edge at its perimeter, therein shielding said upper opening and shedding water outwardly as part of said rainwater infiltration defense mechanism;

wherein a plurality of draining holes being facilitated on the lower wall of said hollow base body just above said base plate, therein to drain out residual rainwater having invaded said hollow base body;

wherein said base plate having outer perimeter cut-outs outside the lower wall of said hollow base body, therein to prevent rainwater from standing near said draining holes.

9. The device of claim 8, wherein said lower face of said raised body having at least one ring-shape drip edge facing said upper face of said hollow base body, wherein diameter of said ring-shape drip edge being larger than diameter of said opening of said hollow base body.

10. The device of claim 8, wherein said opening of said hollow base body having a protection screen, therein to prevent flying insects or birds from entering said opening.

11. The device of claim 8, wherein said raised body and at least one of said first plurality of elongated members being hollow, and wherein said raised body having an opening facing said opening of said hollow base body, therein forming a second conduit between said free space and said hollow base body.

12. The device of claim 11, wherein said opening of said raised body and said opening of said hollow base body having protection screens, therein to prevent flying insects or birds from entering the openings.

* * * * *